United States Patent [19]

Perry

[11] Patent Number: 5,004,282

[45] Date of Patent: Apr. 2, 1991

[54] NEW AND USEFUL IMPROVEMENTS IN UTILITY STREET COVER REMOVAL TOOLS AND METHODS

[75] Inventor: Scott G. Perry, North Berwick, Me.

[73] Assignee: Perry Equipment Corporation, North Berwick, Me.

[21] Appl. No.: 454,895

[22] Filed: Dec. 22, 1989

[51] Int. Cl.[5] .................... B65G 7/12

[52] U.S. Cl. .................... 294/16; 81/463; 254/131; 294/17

[58] Field of Search .................... 294/2, 3, 15-17, 294/24, 26, 49, 50.7-51, 57, 59, 61; 7/114; 81/463, 488, 490; 254/1, 113, 114, 123, 131, 133 R

[56] References Cited

U.S. PATENT DOCUMENTS

| | | | |
|---|---|---|---|
| 747,981 | 12/1903 | Kingsley | 294/17 X |
| 1,933,384 | 10/1933 | Moylan | 294/17 |
| 2,086,318 | 7/1937 | Jackson | 294/17 X |
| 4,072,335 | 2/1978 | Tift et al. | 294/15 X |
| 4,227,731 | 10/1980 | Castle | 294/17 |
| 4,458,415 | 7/1984 | Maher et al. | 81/463 X |
| 4,470,440 | 9/1984 | Thor | 81/463 X |
| 4,482,182 | 11/1984 | Mortensen | 294/15 |
| 4,650,232 | 3/1987 | Perry | 294/15 |

FOREIGN PATENT DOCUMENTS

| | | | |
|---|---|---|---|
| 942840 | 11/1963 | United Kingdom | 294/16 |

*Primary Examiner*—Johnny D. Cherry
*Attorney, Agent, or Firm*—William G. Rhines

[57] ABSTRACT

This invention relates to devices for removing covers for utility installations, such as water meter shut-offs, that are located under streets, sidewalks, and the like. Such covers provide accessible protection for the utility devices that they cover. Embodiments of this invention include a tubular shaft, and a hammer rod which is slidably insertable within the shaft and has a combination chisel point - claw hook at its the lower end for penetrating through pavement material, dirt and the like that may have become deposited in the aperture of the cover, to enable the claw hook to latch beneath the cover and pull on one side of the cover to lift it upward. Through impact on the top of the shaft by the hammer arm via corresponding impact surface, the chisel point on the shaft may be hammered downward to cause it to penetrate into the aperture. The shaft has a hammer rod receptacle pivotally mounted on its side at its lower end into which the hammer arm may be slid following removal from within the shaft after first one and then the other of the apertures in a given cover have been penetrated sufficiently, to form, with the shaft, a long armed claw device with which to lift the cover from its receptacle.

13 Claims, 2 Drawing Sheets

WATER
WATER
WATER

NEW AND USEFUL IMPROVEMENTS IN UTILITY STREET COVER REMOVAL TOOLS AND METHODS

BACKGROUND OF THE INVENTION

It is an accepted practice to construct water, telephone, electric and other utility systems under the surface of travelways, such as roads and walks over which vehicles, pedestrians, and animals travel. Access is sometimes needed into such systems and various of their elements after they have been installed. Thus, a water distribution system may have shut-off valves positioned to facilitate providing or discontinuing or regulating the flow of water from the system into places where the water is used, such as homes, offices, factories, and the like. To get access to such elements without having to tear up the road or other travelway, access ports are provided, typically having a widened portion at the level of the travelway surface to provide a seat in which a cover may be positioned, with a top surface substantially co-planar with the top surface of the travelway. Traditionally, these elements are made from cast or other strong, durable, corrosion and rust resistant, inexpensive, readily formable materials such as cast iron. However, typically they are used along with paving materials which frequently are added for maintenance and repair purposes, and are exposed to sand and salt from winter maintenance and to the weather, with resulting rusting, infiltration, and other forms of chemical and mechanical bonding of contacting surfaces of the elements. These factors, particularly when present in conjunction with the constant downward pressure of passing vehicles and pedestrians, frequently cause the covers to bond to their seats and/or to become tightly wedged, and to the extent of even becoming immovable because of sand and other debris which fills the interstices between them. It is usual for them to be very difficult to remove, and it is not unusual for it to become necessary to break the cover itself and/or the flange of the seat in which a cover resides in order to be able to work the cover loose.

Accordingly, it is an object of this invention to provide means to penetrate the intersticial areas surrounding a utility access cover.

Another object of this invention is to provide such means including means for facilitating lifting such covers from the associated apparatus in which they are seated.

Yet another object of this invention is to provide means for driving such penetration means into such intersticial areas. Still another object is to provide means for achieving the foregoing objects in a unified tool mechanism.

SUMMARY OF INVENTION

Desired objectives may be achieved through practice of the present invention, embodiments of which include a hollow shaft that is adapted to receive a weighty hammer arm with a claw hook at its lower end is provided with a chisel point-claw hook at its lower end and a hammer arm receptacle pivotally side-mounted toward its lower end, the hammer arm having a surface which impacts upon a corresponding surface of the shaft when said arm is inserted into said shaft to the greatest extent, whereby said shaft chisel point may be hammered into one or more of the intersticial regions between a utility access cover and the flange of its associated seat, following which said arm may be removed from said shaft and inserted into said receptacle to form a long-armed tool for grasping a utility cover and extracting it from its associated housing seat.

DESCRIPTION OF DRAWINGS

This invention may be understood from the descriptions which follow and from the accompanying drawings in which.

DESCRIPTION OF PREFERRED EMBODIMENTS

Figures 1, 2, 3:
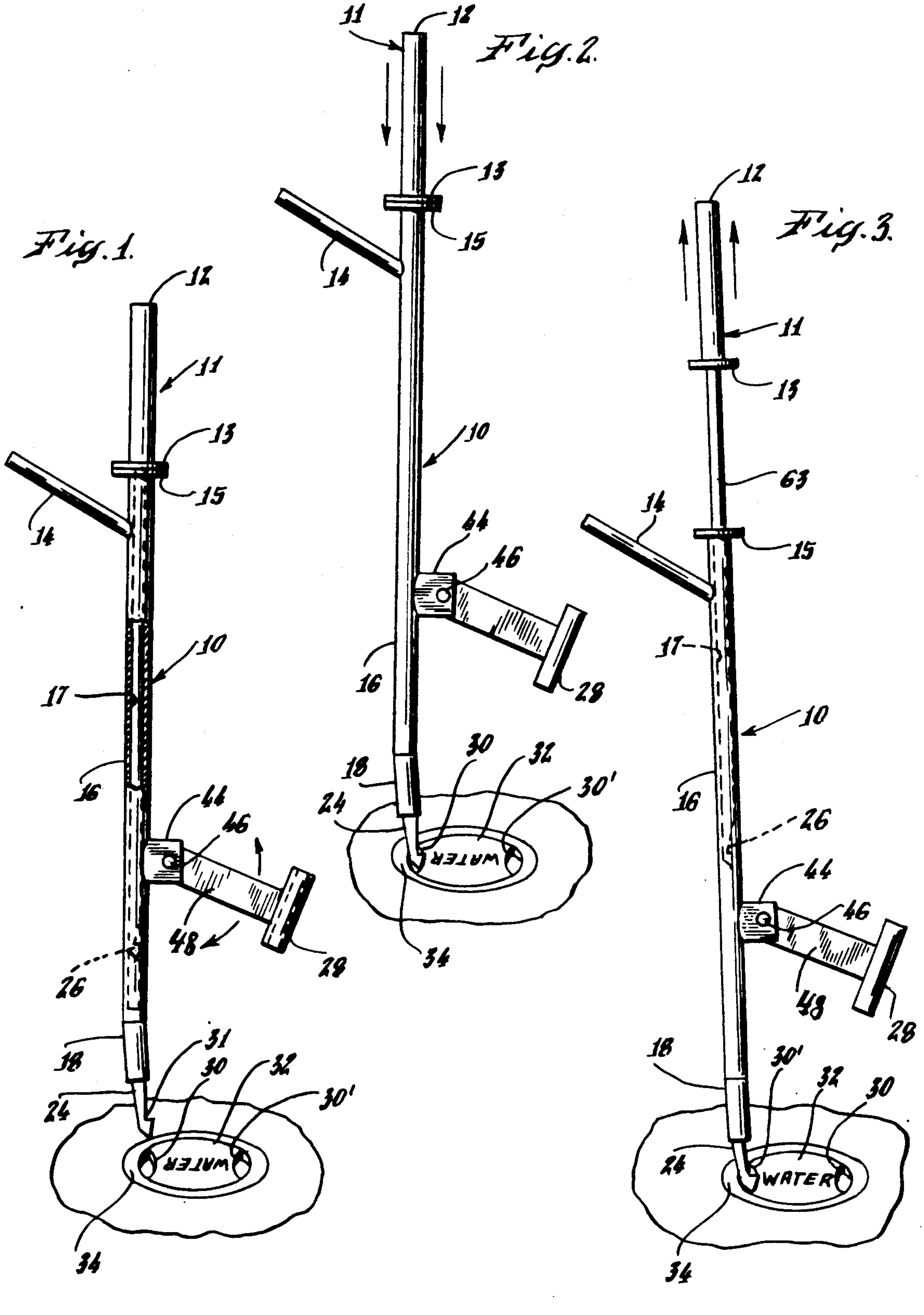
FIG. 1 is a side view of one embodiment of this invention.
FIG. 2 is another side view of the embodiment of this invention shown in FIG. 1.
FIG. 3 is another side view of the embodiment of this invention shown in FIGS. 1 and 2.

Referring first to FIG. 1, there is depicted a cover extraction tool 10, made from steel or other appropriate material, which embodies the present invention. It includes a hollow, elongated shaft 16 having an elongated hole 17 substantially throughout its length, into which may be inserted in slideably moveable relationship therewith a hammer arm 12 having a handle 11 and, optionally, an impact surface 13 at the base of the handle 11. The hammer arm 12 optimally is comparatively heavy, so as to provide high impact forces in use, and comparatively long so as to make it possible to move the hammer arm through a long stroke without it coming out of the hole 17, again to maximize the impact it delivers in use. Although it is within the contemplation of this invention that alternative and/or supplementary hammering means might also be used, the one depicted is the preferred form. Optionally, a side handle 14 may be positioned near the upper end of the shaft 16 to facilitate handling of the tool as hereinafter described. It is an advantage for there to be such a handle, for it to be fairly long, and for it to be affixed to the shaft at about a 45 degree angle, so that maximum impact may be imparted to the shaft 16 with minimum danger of doing harm to the hand which is holding it. The upper end of the shaft 16 may also optionally include an impact surface 15 more or less corresponding in configuration and size to the hammer impact surface 13, upon which the latter impinges when the hammer 12 is inserted into the central hole 17 that runs through the length of the shaft 16. The hole 17 is shown in FIGS. 1 and 3. It is to be understood that the impact surfaces 13, 15, although shown as disk-like end pieces for the elements to which each of them respectfully is mounted, might alternatively take other forms, or even be eliminated entirely. In that case, impact might take place between the lower end of the handle 11 and the upper end of the hollow shaft 16, for example.

The shaft 16 also has mounted on one side of its outer surface a hammer receptacle consisting of a support member 44 by means of which, using a pin 46 as a support, an arm 48 is pivotally mounted to the shaft 16 and includes a tubular hammer arm support 28 that is so oriented that its axis is substantially coplanar with the axis of the shaft 16. The lower end of the shaft 16 has mounted thereon a tip member 18 which includes a chisel point 24 that is adapted to be driven into the interstice or aperture 30 between a utility cover 32 and the flange 34 of the enclosure in which the cap is positioned. It should be noted that in addition to its pointed end which permits it to operate as a chisel to be driven into the aperture 30, the chisel point 24 is slightly bent at the end and includes a notched surface 31 to form a claw hook for grasping the underside of a cover 32. As is shown in FIGS. 1 and 3, the lower end of the hammer rod 12 also includes a claw hook 26 of comparable shape and configuration to that on the shaft 16 which, when used as hereinafter described, performs a comparable function to the one shown on the bottom of the shaft 16. Advantageously, both are made from heat-treated, high strength steel or other material appropriate to the intended use, as will be known per se by persons skilled in the cognizant arts. It should be noted in particular that the hammer rod receptacle 28, when pivotally mounted as herein described, is free to pivot about the pin 46 so that the axis of its tubular receptacle 28 may be made to form an intersection with the axis of the hole in the shaft 16, either above or below the pivot point, and may also at one point be parallel to it, but that both axes will always occupy substantially the same theoretical flat plane.

Figure 4:
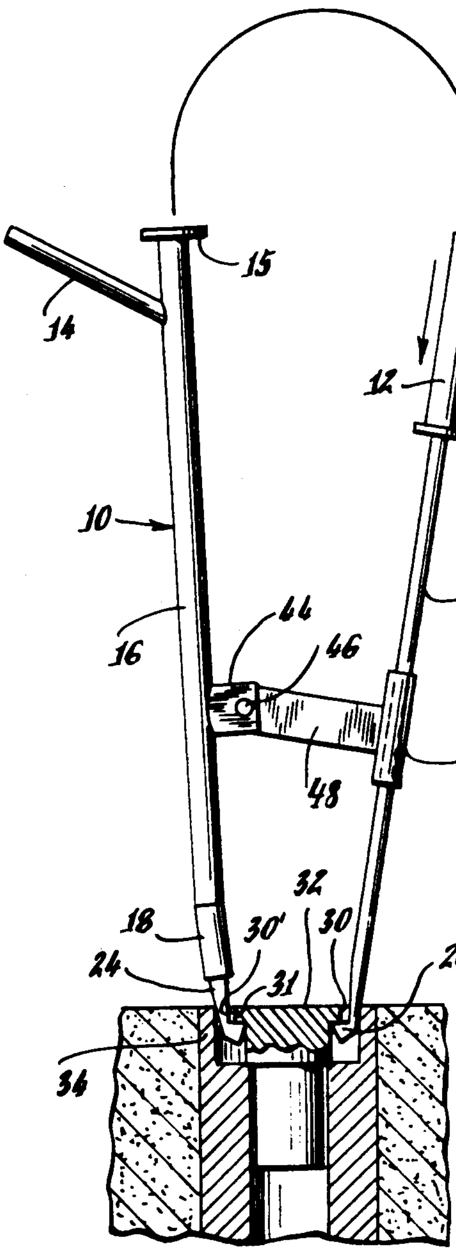
FIG. 4 is yet another side view of this embodiment of this invention shown in FIGS. 1-3.
Figure 5:
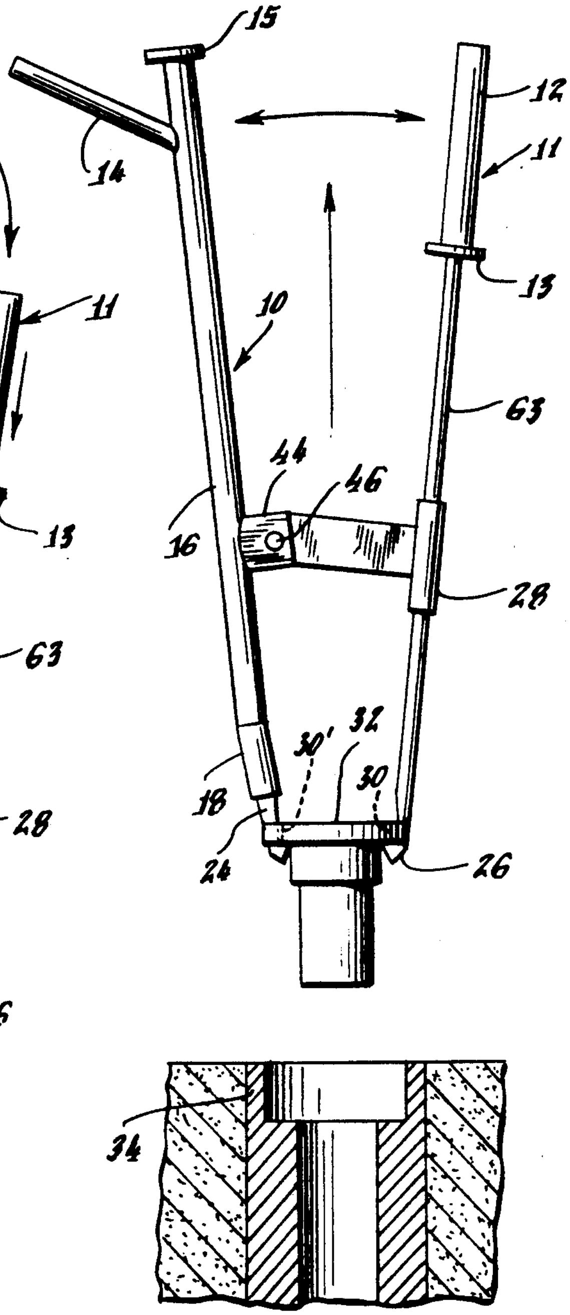
FIG. 5 is still another side view of the embodiment of this invention shown on FIGS. 1-4.

FIG. 3 shows this embodiment of this invention in a first stage of use in removing a utility element cover 32, such as the cap on a water shut-off, from the receptacle in which it is seated. With the chisel point 24 positioned at the aperture 30 of the cover 32, the weighty hammer rod 12 may be forcefully slid upward and then downward by an operator grasping the handles 11, 14, causing the impingement surfaces 13, 15 to collide. The effect of this is to cause the chisel point 24 to be rammed into rust, or other foreign material that may occupy the aperture 30. Once the interstice aperture 30 has been cleared and penetrated by the chisel point to such an extent that the notch 31 is below the level of the underside of the cover 32, the other such aperture 30′ in the same cover may be similarly cleared and penetrated by similar impingement of the same chisel point 24. However, this time the chisel point 24, once rammed through the contaminant materials, may be left in that position. Following that, the hammer arm 12 is slid out of the aperture 17 in the shaft 16 and then slid into the aperture of the tubular portion 28 of the arm support. Then, as shown in FIG. 4, the hammer arm 12 thereby having been so positioned, its grasping hook end 26 may then be inserted into the previously cleared intersticial aperture 30 to such an extent that a notch (unnumbered) as shown, which corresponds in position to notch 31 also resides below the level of the underside of the cover 32. Following that, utilizing the pivoting capability of the arm support 28, the upper end of the shaft 16 being held by one hand of the operator and the handle 11 of the hammer arm 12 being held by the other may simultaneously be flared outward away from each other. This causes the claw hook surfaces at the lower ends of both the shaft 16 and the hammer arm 12 to grasp simultaneously the underside of the cover to be removed, opposite each other in the apertures 30, 30′. So grasped, the operator may then remove the cover from its seat by continuing to hold the two handles apart and simultaneously pulling upward on the tool, as is shown in FIG. 5.

It is to be understood that the embodiments of this invention herein shown and discussed are by way of illustration and not of limitation, and that a wide variety of embodiments may be made without departing from the spirit or scope of this invention.

I claim:

1. A device for removing utility street covers comprising
- a shaft having
  - an interior hole extending from one end of said shaft,
  - a downward oriented combined claw hook—chisel point at the other end of said shaft,
- an impact surface at said one end, and
  - a pivoted hammer arm receptacle mounted on the outside of said shaft below the mid-point along the length of said shaft,
- and a rod-like weighty hammer arm that is removeably slideably positionable within said hole, said hammer arm having
  - a handle at its upper end with an impact surface at the lower end of said handle for impinging upon said impact surface on said shaft when said hammer arm is moved to its point of greatest penetration into said interior hole in said shaft, and
  - a downward oriented claw hook at its lower end,
- said hammer arm receptacle
  - having a tubular hole into which said hammer arm may be slideably moveably positioned,
  - being mounted on said shaft with the axis of said tubular hole substantially in the same imaginary flat plane as the axis of said interior hole in said shaft, and
  - being adapted to pivot with respect to said shaft to enable an imaginary line representing an extension of the axis of said tubular hole with respect to that of said shaft when a hammer arm is positioned within said tubular hole to move among one of intersection above said receptacle, and one of parallelism, and one of intersection below said receptacle,
- whereby, such a hammer arm positioned within said shaft may be used to impel the claw hook-chisel point on said shaft downward through foreign matter in one or more of the access apertures of a utility street cover to a desired extent by repeatedly slideably moving said hammer arm vertically upward, and then downward until its impact surface collides with that of said shaft, and whereby said hammer arm may be removed from said shaft and slid into position within said tubular hole in said receptacle to form, with said shaft, a double armed extraction device for simultaneously penetrating access apertures on substantially opposite sides of a utility street cover and hooking the underside of same with said claw hooks, and thereafter removing same from its seat.

2. The device described in claim 1 wherein said hammer arm and said interior hole in said shaft are both comparatively long in order to permit the hammer arm to travel along a comparatively long path within said hole so as to impart relatively high inertial impact moments of force when said hammer arm is being used to impel the shaft.

3. The device described in claim 2 wherein said interior hole extends substantially the entire length of said shaft.

4. The device described in claim 3 wherein said impact surfaces affixed to said handle and said shaft are in the form of supplementary members.

5. The device described in claim 2 wherein said impact surfaces affixed to said handle and said shaft are in the form of supplementary members.

6. The device described in claim 1 wherein said impact surfaces affixed to said handle and said shaft are in the form of supplementary members.

7. A utility cover removal device comprising penetration means for piercing through foreign materials residing int he access apertures in a utility street cover, first hooking means for hooking the underside of such a cover, elongated support means at one end of which said penetration means and said first hooking means are affixed, hammer means for imparting blows to the opposite end of said support means, second hooking means for hooking the underside of such a cover, said second hooking means being mounted on one end of an elongated lever arm, and mounting means affixed to the side of said elongated support means which faces in the same direction as that in which said first hooking means moves relative to said second hooking means in performing its hooking function, said mounting means being adapted to receive said elongated lever arm with said second hooking means so oriented as to be capable of performing its hooking function by movement toward said first hooking means and to permit said first and said second hooking means to be moved toward each other so as to enable them simultaneously to hook the underside of a utility street cover after both have been inserted into apertures, whereby said cover may be lifted from the seat in which it resides.

8. The device described in claim 7 wherein said penetration means is integrated into the same tip structure as is said first hooking means.

9. The device described in claim 8 wherein said hammer means is in the form of a shaft on one end of which is a handle and to the other end of which is affixed said second hooking means.

10. The device described in claim 9 wherein said elongated lever arm comprises said shaft and said handle.

11. The device described in claim 7 wherein said hammer means is in the form of a shaft on one end of which is a handle and to the other end of which is affixed said second hooking means.

12. The device described in claim 11 wherein said elongated lever arm comprises said shaft and said handle.

13. A method of removing a utility street cover using a device that comprises a hollow-cored shaft that receives in its hollow core a weighty hammer arm with a claw hook at its lower end and which device is provided with a chisel point-claw hook at its lower end and a hammer arm receptacle pivotally side-mounted toward its lower end, the hammer arm having an impact surface to impact upon a corresponding surface of the shaft when said arm is inserted into said shaft to the greatest extent, comprising the steps of positioning said chisel point-claw hook at a first access aperture in said cover, repeatedly moving said hammer arm in upward and downward strokes, causing its impact surface to collide with said impact surface on said shaft, as many times as is necessary to cause said chisel point to penetrate into said first aperture to a desired extent, moving said device so that said chisel point is at a second access aperture in said cover that is substantially opposite said first access aperture, and, while so positioned, moving said hammer arm in upward and downward strokes, causing its impact surface to collide with said impact surface on said shaft, as many times as is necessary to cause said chisel point to penetrate said second aperture to an extent such that the claw hook portion associated with it may grasp the underside of said cover, removing said hammer arm from said shaft and inserting said hammer arm into said hammer arm receptacle to such an extent that its associated claw hook is capable of grasping the underside of said cover, moving the upper end of said shaft and of said hammer arm away from each other sufficiently to cause said claw hooks to impinge upon the sides of said cover with their respectively associated claw hooks so positioned as to be able to impinge upon the underside of said cover sufficiently to move it upward, and, while holding said shaft and said hammer arm with their respective claw hooks so positioned, lifting said cover from the seat in which it resides.

* * * * *